Figure 1:
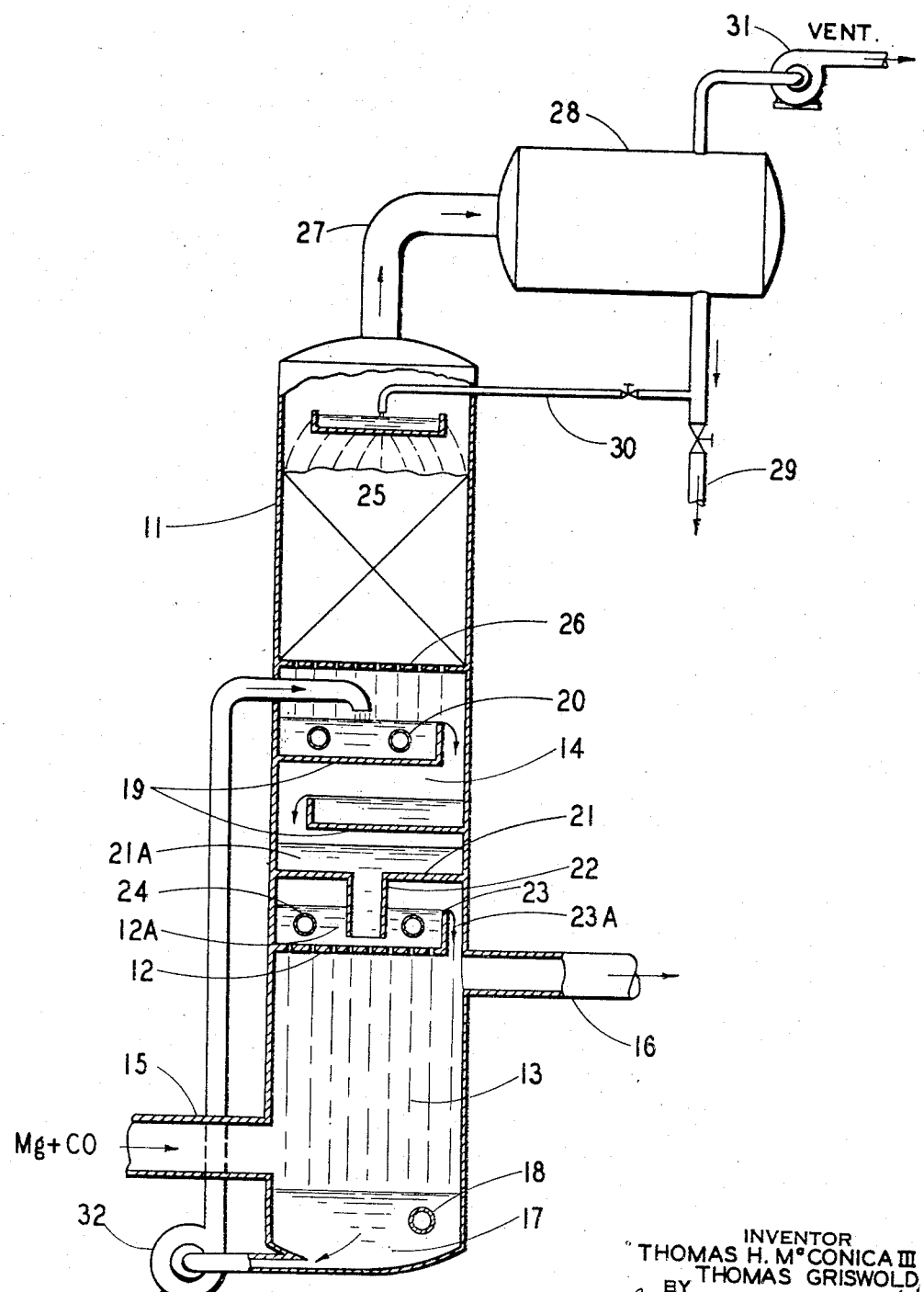

Patented Apr. 22, 1941

2,238,909

UNITED STATES PATENT OFFICE 2,238,909

RECOVERY OF MAGNESIUM FROM VAPOR PHASE MIXTURES

Thomas H. McConica, III, and Thomas Griswold, Jr., Midland, Mich., assignors to The Dow Chemical Company, Midland, Mich., a corporation of Michigan Application June 29, 1940, Serial No. 343,136

9 Claims. (Cl. 75—67)

This invention relates to a process for the recovery of metallic magnesium from its vapor phase mixtures with carbon monoxide.

In the preparation of magnesium by the thermal reduction of magnesia-containing ores with carbon as a reducing agent, the magnesium is liberated at an elevated temperature in the vapor state in admixture with carbon monoxide. As is known the recovery of magnesium from this vapor mixture is made extremely difficult because of the fact that carbon monoxide reacts with magnesium at ordinary condensing temperatures. Numerous recovery processes have been suggested for overcoming this difficulty but most of them are subject to the serious disadvantage that the magnesium is obtained in the form of a pyrophoric dust which can be converted to solid metal only by elaborate and costly treatment.

It is therefore an object of the invention to provide a simple and inexpensive process of recovering magnesium from its vapor mixtures with carbon monoxide in which the recovery of metal is high and in which the magnesium is obtained directly in reguline form. Another object is to provide such a process in which an unusual heat economy is obtained.

According to the invention, magnesium is recovered from vapor phase mixtures with carbon monoxide by passing the vapor mixture into intimate contact with a molten metal absorbent, such as lead, which is miscible with magnesium and supplied at such a temperature that the magnesium condenses and dissolves therein. For example, the vapor mixture may be contacted with a plurality of moving surfaces of the absorbent as by causing it to pass countercurrent to the absorbent in distributed flow. The enriched absorbent solution thus formed is then separated from the vapor mixture, and the magnesium is revaporized from at least a portion of the separated solution, the vapor being condensed as product.

A considerable heat economy may be effected by carrying out the process cyclically in such manner that the heat imparted to the absorbent in the absorption step is utilized to supply at least part of the heat required in the revaporization step. In practice, the partial pressure of magnesium in the revaporization zone is maintained at a value below the vapor pressure of magnesium in the heated enriched absorbent solution entering the zone, either by maintaining the zone at a pressure substantially lower than that in the absorption step or by passing a current of inert gas through the absorbent during revaporization, or both. In this way the magnesium in the enriched solution entering the vaporization zone is flash-vaporized from the absorbent, the heat required being supplied by the sensible heat of the absorbent, which is thus at once regenerated and cooled ready for re-use in the absorption zone.

Figure 2:
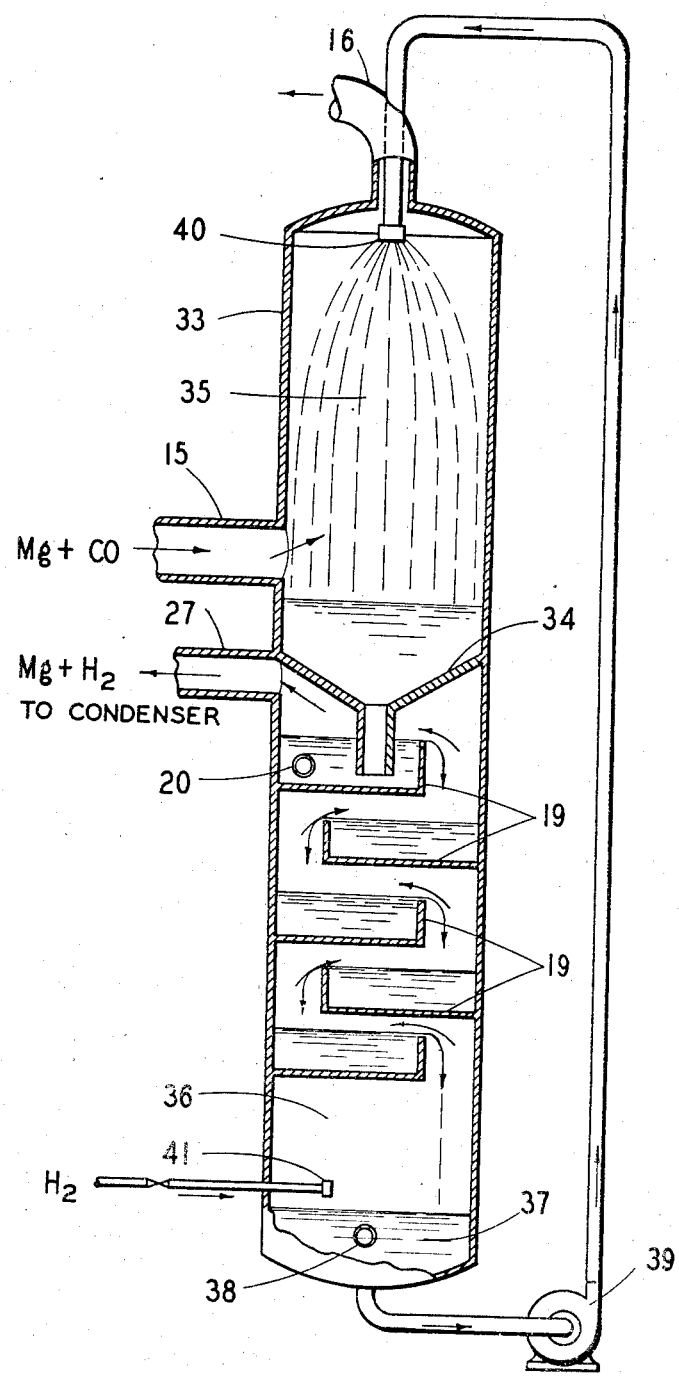

The invention may best be explained in detail with reference to the accompanying drawings in which Figure 1 is a diagrammatic elevation, partly in section, of apparatus adapted to carrying out one form of the process of the invention; and Figure 2 is a similar view of apparatus adapted to carrying out another form of the process.

The apparatus shown in Figure 1 consists essentially of a column 11 divided by a perforated metal plate or sieve 12 into an absorption zone 13 below the plate, and a regeneration zone 14 above. A vapor duct 15 at the lower portion of the zone 13 serves as inlet for the magnesium-carbon monoxide mixture and a similar duct 16 near the top of the zone leads to a suitable vent for carbon monoxide. The absorption zone terminates at its lower end in a sump 17 provided with a heater 18. In the lower portion of the regeneration zone 14, the column 11 is provided internally with one or more superposed overflow trays 19, the uppermost of which is equipped with heaters 20. Below the bottom tray or overflow plate is a diaphragm or cross-partition 21 provided with a downtake 22 leading into a cistern 12a for which the perforated plate 12 forms the bottom, and the depth of which is set by an overflow weir 23. An opening 23a establishes communication between the zone 13 and the vapor space above the plate 12 and below the diaphragm 21. The downtake 22 provides a trap between the two zones 13 and 14. Coolers 24 may be provided in the cistern 12a for regulating the temperature of liquid metal therein.

The upper portion of the column 11 is filled with packing material 25, such as carbon or graphite Raschig rings, supported on a perforated plate or grid 26. At the top of the column is a vapor draw-off 27 leading to a condenser 28, the condensate from which may be withdrawn as product through a valved line 29 or returned in part to the column as reflux through another valved line 30; the condenser is also connected to a vacuum pump 31. The column 11 is provided with pump means 32 and co-operating piping for removing molten metal from the sump 17 and delivering it to the uppermost tray 19 in the regeneration zone 14. The entire apparatus is covered with thermal insulation, not shown.

In beginning the recovery of magnesium in the apparatus of Figure 1, a suitable quantity of molten metal absorbent is loaded into the sump 17 and raised to an operating temperature by the heater 18, after which heating may be discontinued at this point. The pump 32 is then placed in operation, causing the molten metal to fill the trays 19 in the absorption zone, and to overflow downwardly into the cistern 12a, building up an inventory of metal on the perforated plate 12. This metal then flows or trickles continuously through the perforations in the plate, and falls as a rain or shower through the absorption zone 13 back to the sump 17, from which it is recycled. The condenser 28 is cooled. The vacuum pump 31 is operated to reduce the pressure in the condenser 28 and the regeneration zone 14 to a value substantially lower than the pressure in the absorption zone 13, escape of vapor from the latter zone into the lower pressure regeneration zone being prevented by maintaining on the diaphragm 21 a depth of molten metal at least sufficient to equal the pressure differential desired.

When the apparatus is thus in readiness, the vapor mixture of magnesium and carbon monoxide to be treated, which is usually obtained in the reduction of magnesia with carbon in an electric furnace at a temperature above 1000° C., is introduced continuously into the absorption zone 13 through the inlet duct 15. On entering, the mixture flows countercurrent to the shower of molten metal absorbent, the magnesium vapor being readily condensed and dissolved in the absorbent, forming an enriched magnesium-containing melt which collects in the sump 17. The carbon monoxide is substantially unaffected, and is withdrawn through the outlet 16. During the absorption, the heat of condensation of the magnesium vapor and the sensible heat of the vapor and gas is imparted to the absorbent liquid, raising its temperature considerably.

The heated melt showering into the sump 17 is transferred as produced to the uppermost tray 19 in the regeneration zone 14, which is at a pressure substantially lower than that in the absorption zone. On entering the evacuated zone, the dissolved magnesium flash-vaporizes from the heated absorbent as it cascades down the plates 19. This flash-vaporization occurs at the expense of the heat content of the solution, which becomes rapidly cooler. Accordingly by the time the absorbent has fallen to the cistern on the perforated plate 12, not only has practically all the magnesium which was condensed in the absorption zone been revaporized, so that the absorbent is suitable for re-use, but the absorbent has also been cooled to nearly its original temperature. Additional cooling, if necessary, may be supplied by the coolers 24.

The magnesium vapors liberated in the regeneration zone are rectified in the upper portion of the column 11 and passed to a condenser 28 and the condensate is withdrawn through the line 29 as product. A portion may however be returned to the column through the line 30 as reflux to assist in rectification. The heat required for revaporization of the reflux may be supplied by the heaters 20, which may also be regulated to supply heat lost from the column, and if desired to assist in vaporizing the magnesium from the absorbent.

The absorbent used in the process may be any molten metal with which magnesium is miscible, and is preferably a metal having an inappreciable vapor pressure at the operating temperatures. Lead, many alloys consisting essentially of lead, and tin are suitable absorbents; lead is usually preferred because of its lower cost.

The process is operated so that the absorbent is supplied to the absorption zone at a temperature such that the magnesium vapor will condense and dissolve readily therein, temperatures of 500° to 1000° C. being customary. The rate of circulation of the absorbent is preferably controlled so that the temperature rise resulting from the condensation of the magnesium is considerable, say 25° to 200° C. Such a temperature rise assists materially in the flash-vaporization. The absorption zone is conveniently operated at about atmospheric pressure, but other pressures may be employed. As explained, the regeneration zone is maintained at a pressure substantially lower than that in the absorption zone; a large pressure differential greatly improves the flash-vaporization of the magnesium. In a typical instance, with the absorption zone at atmospheric pressure or slightly below, the regeneration zone would be maintained at an absolute pressure of 10 to 50 millimeters of mercury.

Instead of employing a pressure differential between the zones in the process to effect vaporization of the condensed magnesium from the absorbent while utilizing the heat of condensation liberated in the absorption zone to supply at least part of the heat required in the regeneration zone, the same result may be achieved by using a current of an inert gas.

This latter process may be carried out in apparatus such as is shown in Fig. 2. A column 33 is divided by a diaphragm plate 3 into an upper absorption zone 35 and a lower regeneration zone 36, the latter provided interiorly with overflow trays 19 and a heater 20 similar to those of the apparatus of Fig. 1. At the bottom of the regeneration zone is a sump 37 including a heater 38, pump means 39 being arranged to withdraw molten metal from the sump 37 and transfer it to a distributor or spray nozzle 40 in the top of the absorption zone. A gas inlet nozzle 41 is disposed just above the sump 37.

The operation of the apparatus is similar to that of Fig. 1 except that in the regeneration zone 36 the pressure may be higher, even approximately the same as that in the absorption zone. A current of a gas chemically inert to the absorbent and the magnesium, e. g. hydrogen or helium, is introduced through the nozzle 41 and passed countercurrent to the absorbent cascading down the overflow trays 19. This gas current, which may be heated, if desired, tends to "blow out" the dissolved magnesium from the absorbent, according to familiar physicochemical principles. The magnesium vapor and inert gas escape from the regeneration zone through the upper outlet 27 to a condenser not shown, where the magnesium is recovered as product.

The process of the invention has the advantage that the magnesium is condensed and removed from the carbon monoxide so rapidly by contact with the absorbent that substantially no reaction between the magnesium and carbon monoxide occurs. High yields of magnesium are obtained and the product is recovered from the regeneration step as reguline metal in readily usable form. Moreover, since substantially all of the heat liberated in the step of absorbing the magnesium is utilized in the regeneration step, the heat requirements of the process are low and high thermal efficiencies are obtained. The entire system is self-stabilizing in that the concentration of magnesium in the absorbent will remain at a definite value for any given temperature, pressure, and rate of circulation. Likewise the quantity of magnesium in the system does not vary under constant operating conditions, so that the metal is recovered as product at the same rate at which it is supplied to the system.

Other modes of applying the principle of the invention may be employed instead of those explained, change being made as regards the details of the process, provided the steps recited in any of the following claims, or their equivalent, are employed.

We are aware that others have suggested recovering magnesium from vapor mixtures with carbon monoxide by absorbing the magnesium in molten lead, and we make no claim broadly to such process.

What we claim is:

1. In a cyclic process for recovering magnesium from its vapor phase mixtures with carbon monoxide, the steps which comprise: introducing the vapor mixture into an absorption zone and passing it into intimate contact with a molten metal absorbent miscible with liquid magnesium and having a boiling point above that of magnesium supplied at such a temperature that magnesium vapor is condensed and dissolved therein, whereby the heat of condensation is imparted to the magnesium-containing solution thus formed; separating the heated solution from the vapor mixture and withdrawing at least part thereof from the absorption zone; introducing the heated solution thus withdrawn into a regeneration zone and vaporizing magnesium therefrom by maintaining the partial pressure of magnesium in said zone at a value below the vapor pressure of magnesium in the heated solution entering the zone, whereby the absorbent is cooled and regenerated for re-use in the absorption zone; and withdrawing the vaporized magnesium from the regeneration zone and condensing it as product.

2. A process according to claim 1 wherein in the absorption zone the vapor phase mixture is passed into contact with a moving surface of the absorbent.

3. A process according to claim 1 wherein in the absorption zone the vapor mixture is passed into contact with a plurality of moving surfaces of the absorbent.

4. A process according to claim 1 wherein in the absorption zone the vapor mixture is passed countercurrent to a shower of the absorbent.

5. A process according to claim 1 wherein the regeneration zone is maintained at a pressure substantially lower than the pressure in the absorption zone, whereby the magnesium dissolved in the heated absorbent solution tends to flash-vaporize in the regeneration zone.

6. A process according to claim 1 wherein in the regeneration zone the vaporization of the magnesium from the heated absorbent solution is assisted by passing a current of inert gas through the solution.

7. A process according to claim 1 wherein the magnesium liberated in the regeneration zone is rectified in the said zone.

8. A process according to claim 1 wherein the molten metal absorbent consists essentially of lead.

9. In a continuous cyclic process for recovering magnesium from its vapor phase mixture with carbon monoxide, the steps which comprise: introducing the vapor mixture into an absorption zone and passing it countercurrent to a distributed flow of a molten metal absorbent miscible with liquid magnesium and having an inappreciable vapor pressure at the operating temperatures supplied at such a temperature that magnesium vapor is condensed continuously and dissolved therein, whereby the temperature of the absorbent is raised; separating the heated enriched absorbent from the vapor mixture, and withdrawing at least part thereof from the absorption zone; introducing the enriched absorbent thus withdrawn into a regeneration zone in which the partial pressure of magnesium is maintained at a value below the vapor pressure of magnesium in the heated enriched absorbent, whereby the magnesium dissolved in the absorbent is vaporized and the absorbent is regenerated and cooled for re-use in the absorption zone; separating the absorbent from the evolved vapor; and recycling the absorbent to the absorption zone.

THOMAS H. McCONICA, III.
THOMAS GRISWOLD, Jr.